(12) United States Patent
Memon

(10) Patent No.: US 9,756,139 B2
(45) Date of Patent: Sep. 5, 2017

(54) EXECUTING REQUESTS FOR SERVICES USING SHARED LOCATION DATA

(71) Applicant: Facebook, Inc., Menlo Park, CA (US)

(72) Inventor: Amir Hussain Memon, Fremont, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/586,460

(22) Filed: Dec. 30, 2014

(65) Prior Publication Data

US 2016/0191637 A1 Jun. 30, 2016

(51) Int. Cl.
| | | |
|---|---|---|
| *G01C 21/00* | (2006.01) | |
| *H04L 29/08* | (2006.01) | |
| *G06F 3/0484* | (2013.01) | |
| *G01C 21/34* | (2006.01) | |
| *H04W 4/02* | (2009.01) | |
| *H04W 4/20* | (2009.01) | |

(52) U.S. Cl.
CPC ............. *H04L 67/18* (2013.01); *G01C 21/34* (2013.01); *G06F 3/04842* (2013.01); *H04L 67/20* (2013.01); *H04L 67/28* (2013.01); *H04W 4/02* (2013.01); *H04W 4/206* (2013.01)

(58) Field of Classification Search
CPC .... G06F 17/30241; G08G 1/20; G01C 21/20; G01C 21/28; G01C 21/3673
USPC ......................................................... 701/522
See application file for complete search history.

(56) References Cited

U.S. PATENT DOCUMENTS

| | | |
|---|---|---|
| 8,688,532 B2 | 4/2014 | Khunger et al. |
| 2008/0028063 A1 | 1/2008 | Holmes et al. |
| 2011/0112717 A1 | 5/2011 | Resner |
| 2011/0145089 A1* | 6/2011 | Khunger ............ G01C 21/3438 705/26.4 |

FOREIGN PATENT DOCUMENTS

| | | |
|---|---|---|
| KR | 10-0791811 B1 | 1/2008 |
| KR | 10-2013-0040430 A | 4/2013 |

OTHER PUBLICATIONS

Can I request a ride for a friend? Uber.com downloaded on Jul. 25, 2014 at Https://support.uber.com/hc/en-us/sections/200390138-How-Uber-Works, 2 pgs. (hereinafter referred to as Uber in rejection).*

(Continued)

*Primary Examiner* — Maceeh Anwari
(74) *Attorney, Agent, or Firm* — Nicholson De Vos Webster & Elliott LLP

(57) ABSTRACT

Exemplary methods, apparatuses, and systems receive, from a first user device associated with a first user, location data representing a current physical location of the first user. A request for the current physical location of the first user is received from a second user device associated with the second user. In response to the received selection, the current physical location of the first user based upon the shared location data is transmitted to the second user device. A selection of a third party service is received from the second user device. The current physical location of the first user is transmitted to a server associated with the third party service within a request for the third party service to send the a service or product to the current physical location of the first user.

18 Claims, 15 Drawing Sheets

(56) References Cited

OTHER PUBLICATIONS

Google Maps + Uber: iFive for the iPhone 90 published on May 7, 2014 and retrieved at: https://www.youtube.com/watch?v=4qetqPZ-XEs (hereinafter referred to as Google Maps in rejection).*

Waze Releases New Version (3.8) published on Jun. 18, 2014 retrieved at: https://www.youtube.com/watch?v=cZs6osanDDQ (hereinafter referred to as Google Maps in rejection).*

Can 1 Request a Ride for a Friend?, Uber.com, downloaded on Jul. 25, 2014 at: https://support.uber.com/hc/en-us/sections/200390138-How-Uber-Works, 2 pages.*

Cutler, Kim-Mai, MeetMe iPhone app solves pesky problem of finding a meeting point, VentureBeat, Social, downloaded at: http://venturebeat.com/2009/07/21/meetme-iphone-app-solves-pesky-problem-of-finding-a-meeting-point/, Jul. 21, 2009, 5 pages.*

Can I Request a Ride For a Friend?, Uber.com, downloaded on Jul. 25, 2014 at: https://support.uber.com/hc/en-us/sections/200390138-How-Uber-Works, 2 pages.

Google Maps on Mobile Gets Uber Integration and More, TechCrunch, downloaded on Aug. 20, 2014 at: http://techcrunch.com/2014/05/06/google-maps-on-mobile-gets-uber-integration-and-more/, 7 pages.

Share your drive, From waze, downloaded on Jul. 27, 2014 at: https://wiki.waze.com/wiki/Share_your_drive, 3 pages.

Levine, Barry, Uber opens up its API and creates a new platform, VentureBeat, Business, downloaded at: http://venturebeat.com/2014/08/20/uber-opens-up-its-api-and-creates-a-new-platform/, Aug. 20, 2014, 6 pages.

PCT International Search Report and Written Opinion for PCT/US2015/067181, dated Apr. 14, 2016, 11 pages.

\* cited by examiner

EXECUTING REQUESTS FOR SERVICES USING SHARED LOCATION DATA

FIELD

The various embodiments described herein relate to sharing location data in real-time. In particular, embodiments relate to executing requests for services based upon real-time location data shared between users of a network service.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, share location data, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

SUMMARY OF THE DESCRIPTION

Exemplary methods, apparatuses, and systems receive, from a first user device associated with a first user, location data representing a current physical location of the first user. For example, a mobile device may run a location-sharing application that uploads global positioning system (GPS) data or other location data obtained by the mobile device to a server. Embodiments receive a request for the current physical location of the first user from a second user device associated with the second user. In response to the received selection, the current physical location of the first user based upon the shared location data is transmitted to the second user device. For example, within the location-sharing application, the first user may designate that the second user, individually or as a part of a group, is able to view the first user's location. Embodiments further receive a selection of a third party service from the second user device. The current physical location of the first user is transmitted to a server associated with the third party service within a request for the third party service to send a service or product to the current physical location of the first user. For example, the second user may select a car service and instruct embodiments described herein to request the car service pick up the first user, take the second user to the first user, etc.

In another embodiment, a request to provide navigation for a caravan is received. For example, the first and second users may be travelling in two different vehicles. One user will lead the caravan and the other user will be a follower. Using the shared location data between the first and second users, embodiments provide the follower with a regularly updated route to the leader as the leader is travelling. Embodiments further enable the leader to enter a destination and share the destination with the follower. The follower receives the destination and may change the routing from following the leader to a mapped route to the final destination. Additionally, embodiments enable the follower and leader to trade roles, such that the leader becomes the follower and the follower becomes the leader. Embodiments further enable the users to easily communicate via message or call within the caravan navigation user interface.

In yet another embodiment, a request to provide a suggested meeting location for the first and second users is received. For example, the request may include a category, such as restaurants, cafes, bars, etc. Embodiments determine a midpoint area between the shared locations of the first and second users. Embodiments further determine one or more locations in the midpoint area that one or both of the users have frequented or that are otherwise determined to meet user preferences. The determined one or more locations are presented as recommendations.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein execute requests for services based upon real-time location data shared between users of a network service. In particular, embodiments enable users within a location sharing application to select another user and request a car service based upon the location data shared by the selected user, deliver an item to the selected user based upon the location data shared by the selected user, request navigation for a caravan (e.g., regularly updated routes from a caravan follower to the caravan leader), and/or request a recommendation for a location to meet the selected user. As a result, users of a real-time location data sharing platform are able to utilize the platform to automate requests for services based upon shared location data rather than passively viewing of other user's location.

In the following description, numerous specific details are set forth. However, it is understood that embodiments of the invention may be practiced without these specific details. While a social networking system is used to describe embodiments of promotion configuration and facilitation, it will be understood that these concepts are generally applicable to other network services/entities, websites, etc. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
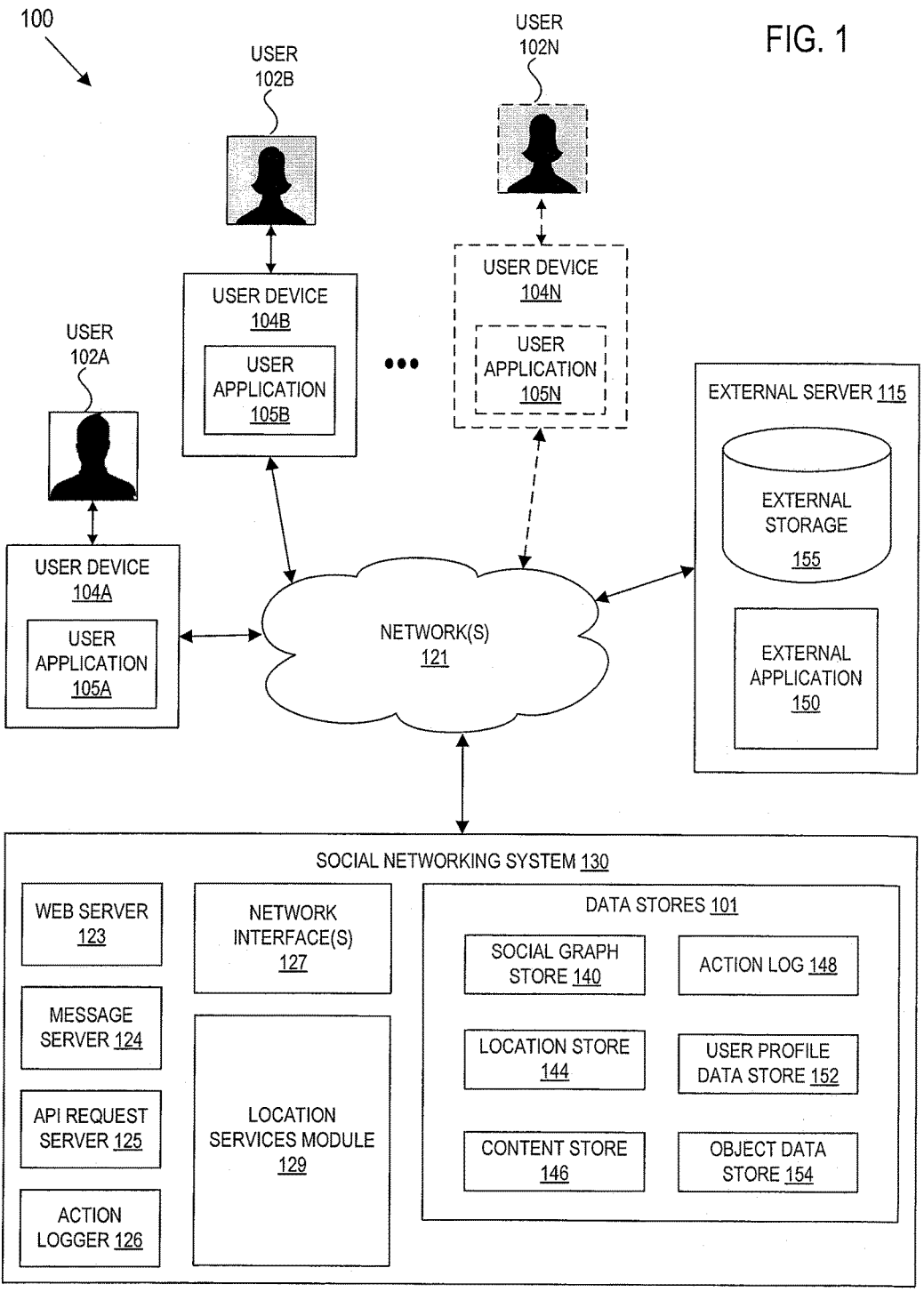
FIG. 1 illustrates an exemplary network environment of a social networking system to execute requests for services based upon real-time location data shared between users of a network service.

FIG. 1 illustrates an exemplary network environment of a system 100, including a social networking system 130, to execute requests for services based upon real-time location data shared between users of a network service. Social networking system 130 offers its users 102A-102N the ability to communicate and interact with other users 102A-102N and entities of the social networking system 130 according to an embodiment of the invention. The user devices 104A-104N are enabled to interact with social networking system 130 and can be any type of computing device capable of receiving user input as well as transmitting and/or receiving data via a network (e.g., network 121). Exemplary user devices 104A-104N include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices programmed to implement one or more embodiments set forth herein.

In one embodiment, a user device (e.g. 104A) may execute a user application (e.g. 105A) allowing a user 102A of the user device 104A to interact with the social networking system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the user application 105A is the native platform or operating system of the user device 104A, such as Windows®, Mac OSX®, iOS®, or ANDROID™, which may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols.

In some embodiments, the social networking system 130 comprises one or more computing devices storing user profiles associated with users 102A-102N and/or other objects, as well as connections between users and other users 102A-102N and/or objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a movie, food, etc.

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions. An exemplary social graph is described with reference to FIG. 2.

To provide these functionalities, the embodiment of the social networking system 130 includes an API request server 125, a web server 123, a message server 124, an action logger 126, and a set of data stores 101. This embodiment also includes, within the data stores 101, a social graph store 140 including a node store 142 and a promotion store 144, as well as a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a "post." In some embodiments, a user can send a private message to another user that can only be retrieved by the other user.

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, creating a post or otherwise sending a message to another user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The action log 148 may be used by the social networking system 130 to track other user actions on the social networking system 130, as well as actions on an external application 150 (e.g., website) that are communicated to the social networking system 130. For example, the social networking system 130 may allow users to interact with external (e.g., third-party) applications 150 (e.g., websites), external storage 155, and/or external servers 115 (e.g., server end stations). The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, social networking system 130 includes a location services module 129 to execute requests for services based upon real-time location data shared between users. In an alternate embodiment, the location services module 129 is a part of the external server 115. For example, the location services module 129 may be implemented by the external application 150. In one embodiment, location services module 129 generates a graphical user interface (GUI) including a plurality of selectable elements for the configuration of a location-based request. The GUI is transmitted to and displayed by a user device 104. Selections of elements within the GUI are received from the user device 104 and used to execute the location-based services described herein. The execution of the location-based services is described herein with reference to FIGS. 3-11.

Figure 2:
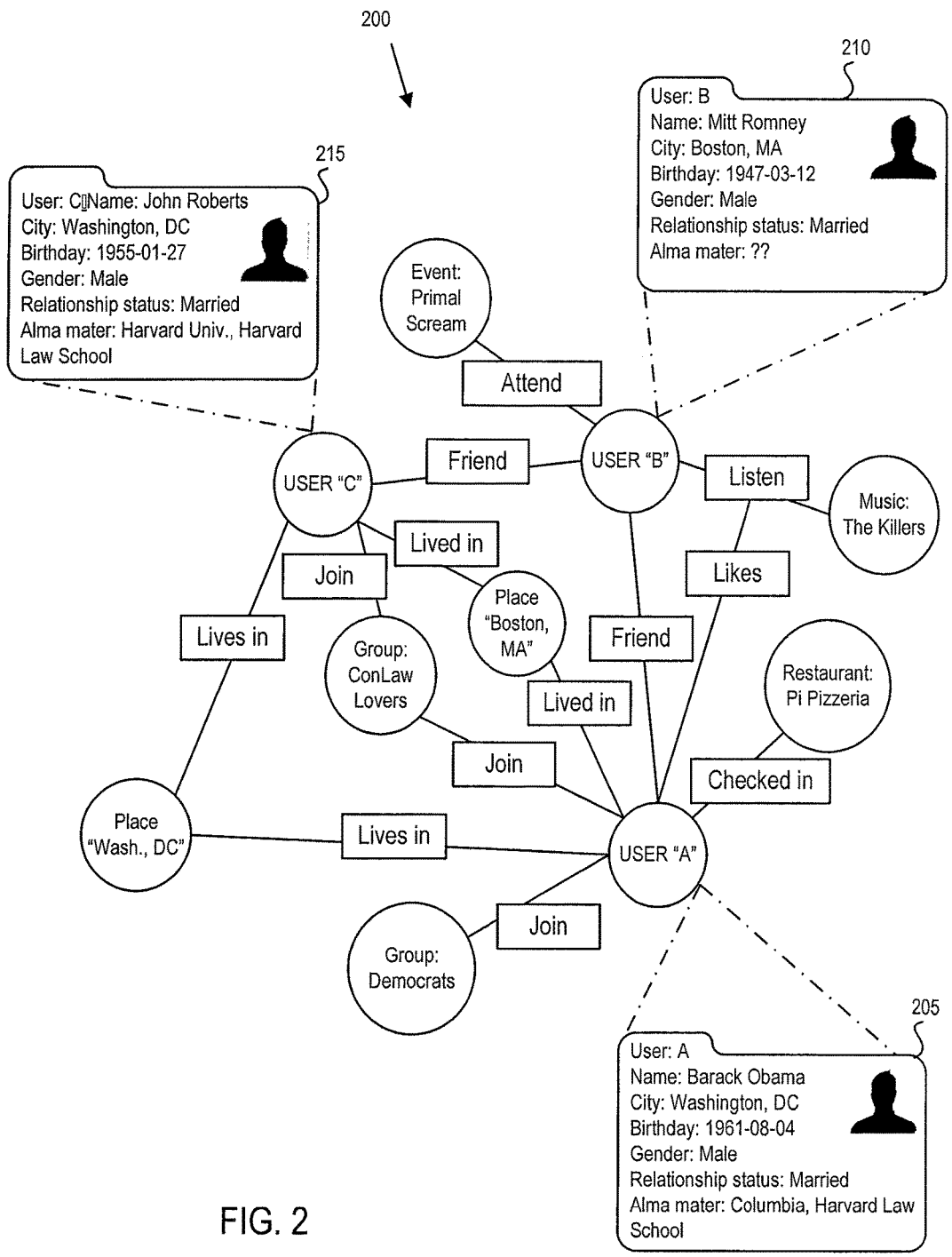
FIG. 2 illustrates an exemplary graph of social network data used to execute requests for services based upon real-time location data shared between users of a network service.

FIG. 2 illustrates exemplary graph 200 of social network data used to execute requests for services based upon real-time location data shared between users of a network service. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, checked-in at Pi Pizzeria, and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, the location services module 129 utilizes user characteristics stored in the graph 200 to execute one or more location-based services. For example, location services module 129 may utilize user connections (based upon selection, connection type, affinity, etc.) within social graph 200 to apply privacy controls for sharing location data. Additionally, location services module 129 may utilize graph 200 to share profile information with a third party service or to determine location suggestions, e.g., based upon user feedback, preferences, check-ins, etc. as described herein.

Figure 3A:
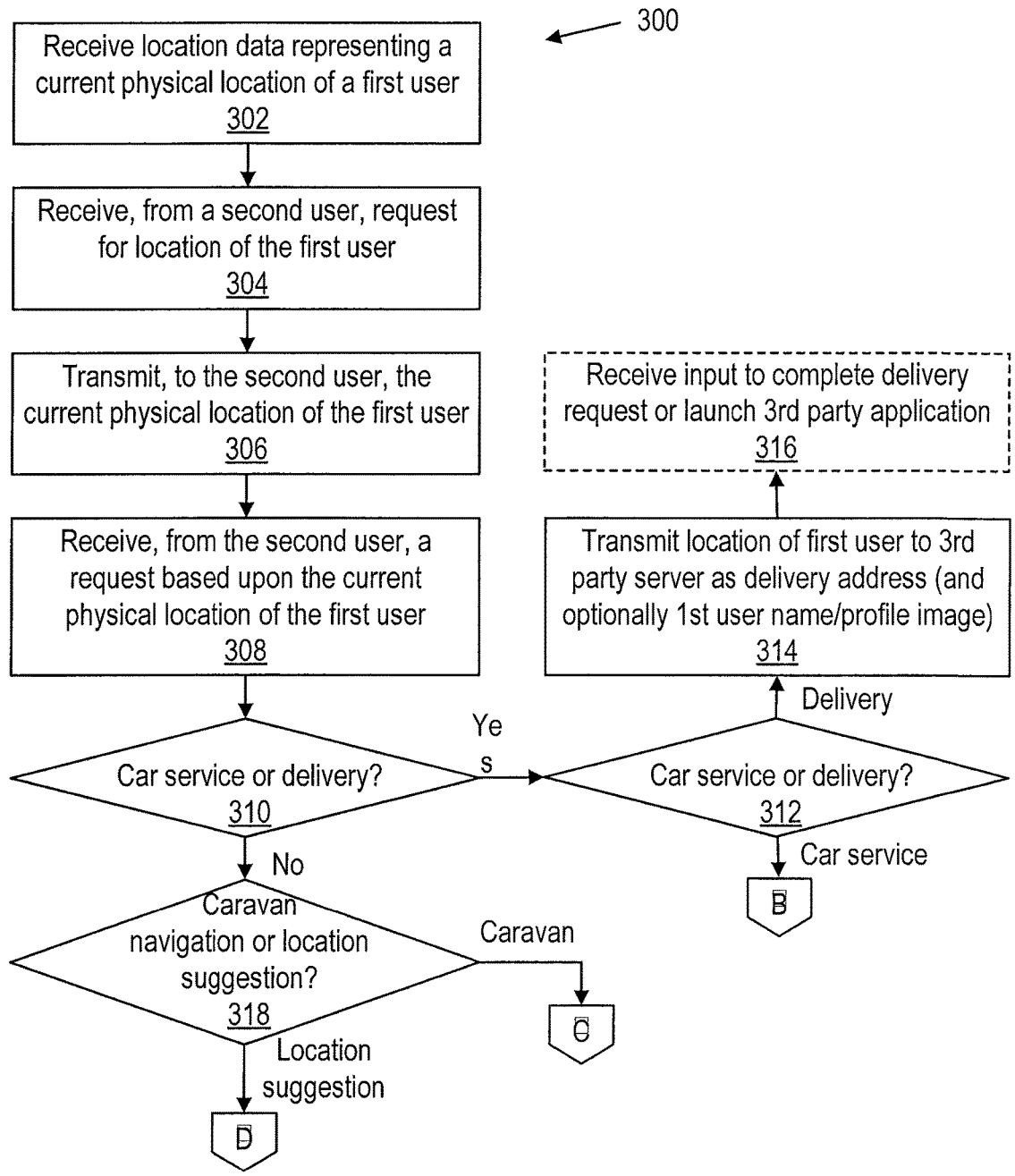
FIGS. 3A-D illustrate an exemplary method of executing requests for services based upon real-time location data shared between users of a network service.

FIGS. 3A-D illustrate exemplary method 300 of executing requests for services based upon real-time location data shared between users of a network service. Referring to FIG. 3A, at block 302, location services module 129 receives location data representing a current physical location of a first user. For example, mobile device 104 is associated with a user account for the first user, the account including a privacy control permitting the sharing of location data. The mobile device 104 runs a location-sharing application 105 that uploads global positioning system (GPS) data or other location data obtained by the mobile device 105 to location services module 129.

At block 304, location services module 129 receives a request for the current physical location of the first user from a second user device associated with a second user account. For example, a location sharing application 105 running on the second user's mobile device 104 transmits the request to location services module 129 in response to opening the location sharing application 105 (or location sharing feature within another application 105) and/or selecting a representation of the first user within the application 105.

At block 306, location services module 129 transmits the current physical location of the first user to the second user. For example, location services module 129 transmits the received location data or another representation of the first user's location data to the second user's mobile device.

At block 308, location services module 129 receives a request from the second user device for a service based upon the current physical location of the first user. Exemplary location based services include, but are not limited to, a car service, product delivery, caravan navigation, and meeting location suggestions.

At block 310, location services module 129 determines if the request is for one of a car service or delivery of a product. If the request is for a car service or delivery of a product, at block 312, location services module 129 determines whether the request is for the car service or for the delivery of a product. If the request is for the delivery of a product, at block 314, location services module 129 transmits the current physical location of the first user to a third party server as the delivery address. For example, location services module 129 utilizes an application programming interface (API) to transmit the address to a third party shopping or delivery platform 150. In one embodiment, location services module 129 transmits the current physical location of the first user along with order information for the product/delivery. Alternatively, location services module 129 transmits the current physical location of the first user in anticipation of the second user entering order information for the product/delivery.

In one embodiment, location services module 129 transmits user profile information associated with the first user's account along with the current physical location of the first user. For example, location services module 129 may transmit the first user's name and/or profile picture (if permitted by the first user's privacy settings) to further facilitate the delivery.

At block 316, location services module 129 optionally receives input from the second user to complete the delivery request or launch a third party application. For example, location services module 129 presents a user interface to receive user input to complete the delivery request and/or launches a third party application (e.g., within the social networking system 130 platform or external to the social networking system 130) to complete the delivery request. Alternatively, location services module 129 completes the delivery request or launches a third party application in conjunction with transmitting the current physical location of the first user to the third party server.

If the request is for a car service, method 300 continues via off page connector B and is described with reference to FIG. 3B. If the request is for neither a delivery nor a car service, at block 318, location services module 129 determines if the request is for caravan navigation or a meeting location suggestion. If the request is for caravan navigation, method 300 continues via off page connector C and is described with reference to FIG. 3C. If the request is for a meeting location suggestion, method 300 continues via off page connector D and is described with reference to FIG. 3D.

Figure 3B:
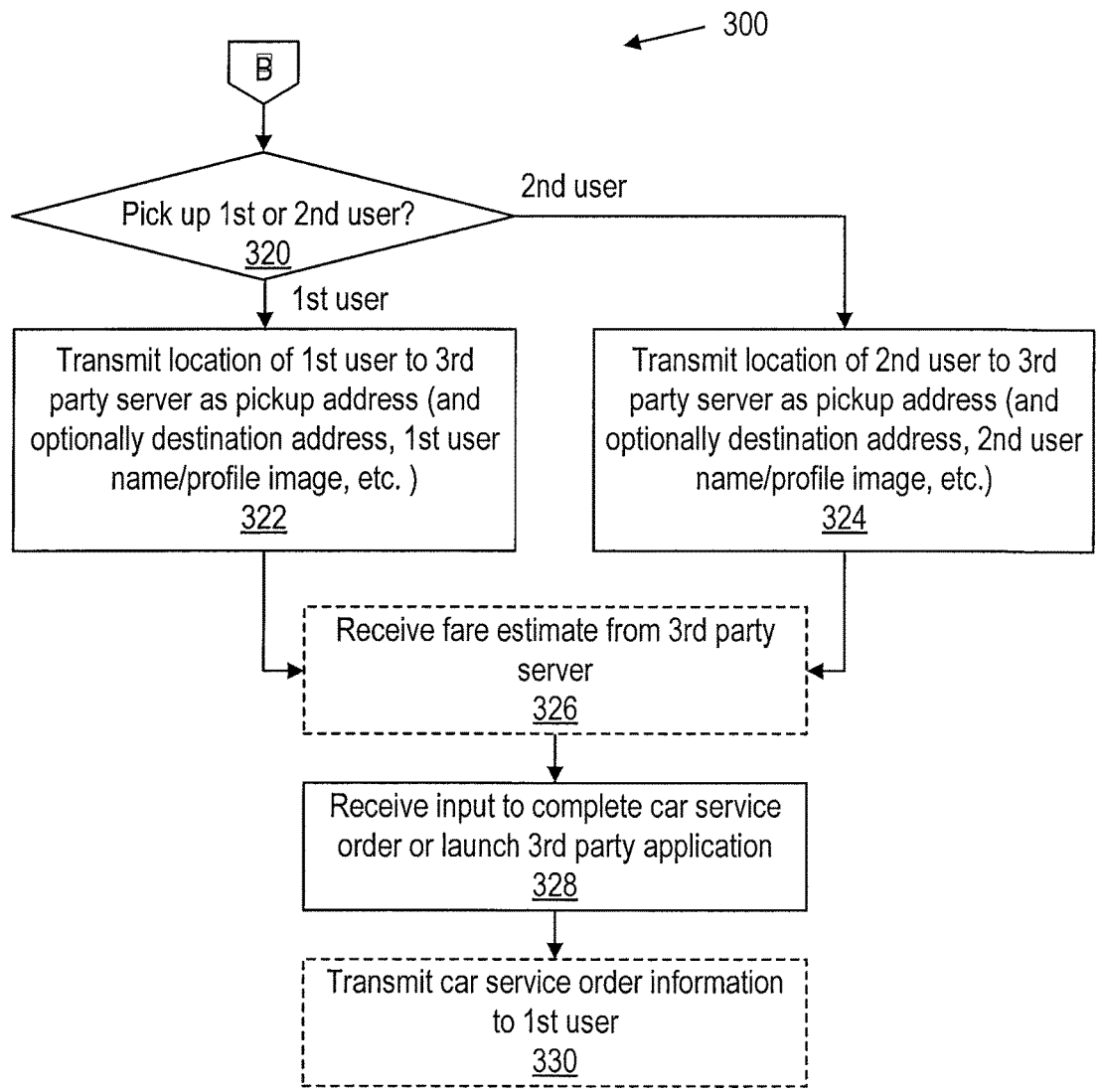

Referring to FIG. 3B, at block 320, location services module 129 determines if the request is for the car service to pick up the first user or for the car service to pick up the second user. For example, location services module 129 may present the second user with selectable options to request the car service to bring the first user to the second user or to bring the second user to the first user. In one embodiment, location services module 129 presents the second user with a selectable option to request the car service to pickup the first user without a destination or a different destination than the current physical location of the second user.

If the request is for the car service to pick up the first user, at block 322, location services module 129 transmits the current physical location of the first user to a third party server associated with the car service as a pickup address. In one embodiment, location services module 129 also transmits a destination address. For example, if the request is for the car service to bring the first user to the second user, location services module 129 transmits the current physical location of the second user as the destination address. In one embodiment, location services module 129 also transmits user profile information associated with the first user's account along with the current physical location of the first user. For example, location services module 129 may transmit the first user's name and/or profile picture (if permitted by the first user's privacy settings) to enable the driver for the car service to identify the first user as the scheduled passenger.

If the request is for the car service to pick up the second user, at block 324, location services module 129 transmits the current physical location of the second user to a third party server associated with the car service as a pickup address. In one embodiment, location services module 129 also transmits a destination address. For example, if the request is for the car service to bring the second user to the first user, location services module 129 transmits the current physical location of the first user as the destination address. In one embodiment, location services module 129 also transmits user profile information associated with the second user's account along with the current physical location of the second user. For example, location services module 129 may transmit the second user's name and/or profile picture (if permitted by the second user's privacy settings) to enable the driver for the car service to identify the second user as the scheduled passenger.

At block 326, location services module 129 optionally receives a fare estimate from the third party server. For example, if location services module 129 transmits both a pickup address and a destination address to the third party server (e.g., to bring the first user to the second user or vice versa), the third party server may respond with a fare estimate prior to or as a part of completing the car service request.

At block 328, location services module 129 receives input to complete the car service order or launch a third party application to complete the order. For example, location services module 129 presents a user interface to receive user input to complete the car service order and/or launches a third party application (e.g., within the social networking system 130 platform or as external to the social networking system 130) to complete the car service order.

At block 330, location services module 129 optionally transmits a car service order confirmation to the first user.

For example, location services module 129 may receive order confirmation information in response to completing the car service order. If the second user requested the car service to pick up the first user, location services module 129 notifies the first user of the request. In one embodiment, the notification includes confirmation information such as: an identification of the car service company, identification of the car service vehicle that will pick up the first user, identification of the car service driver that will pick up the first user, and/or an estimated time the car service will pick up the first user.

Requests for a car service based upon shared location data is further described herein with reference to FIGS. 4-8.

Figure 3C:
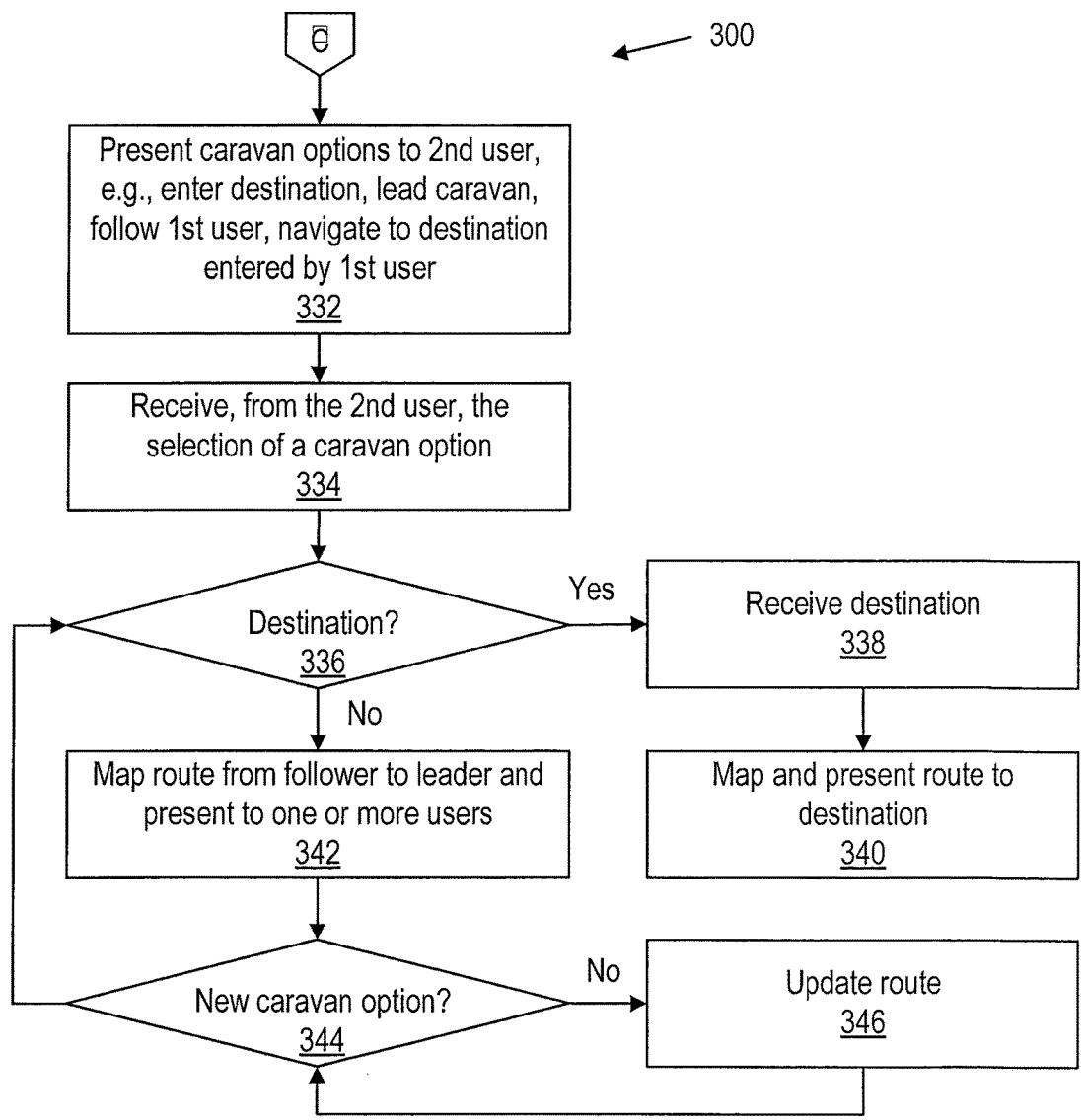

Referring to FIG. 3C, at block 332, location services module 129 presents caravan options to the second user. For example, location services module 129 presents the second user with selectable options to enter a caravan destination, lead the caravan, follow the first user in a caravan, or navigate to a destination entered by the first user.

At block 334, location services module 129 receives the selection of one of the caravan options from the second user device. At block 336, determines if the received selection is a request to enter a destination for the caravan. If the received selection is a request to enter a destination, at block 338, location services module 129 receives the destination address. For example, the user may enter a street address, landmark, or other location data into an input box presented in a GUI. Alternatively, the receipt of the destination address may include user selection of a location that has already been entered, shared, or otherwise determined by location services module 129. For example, the received destination address may be the shared location of another user or a location from a history of entered destinations.

In one embodiment, location services module 129 provides the user entering the destination the option to share the destination with another user within the caravan. For example, the user may select the option from a menu, check a box, etc. to share the destination and, in response to the selection, location services module 129 provides the destination to the other user as described further herein.

At block 340, location services module 129 maps a route to the entered destination and presents the route to one or more of the users within the caravan. For example, location services module 129 generates a map and/or list of navigation instructions from the current location of the second user in response to the second user entering the destination. If the received selection (at block 336) is to navigate to the same destination as entered by the first user, location services module 129 generates a map and/or list of navigation instructions from the current location of the second user to the destination entered by the first user. In one embodiment, location services module 129 utilizes a third party API to generate the route.

If the received selection (at block 336) is not a request to enter a destination, at block 342, location services module 129 maps a route from the second user, as a follower, to the first user, as the leader, and presents the route to one or both of the users within the caravan. For example, if the second user selects to follow the first user within the caravan, location services module 129 maps and presents a route from the second user (the follower) to the first user (the leader). If the second user enters a selection indicating that the second user will lead the caravan, location services module 129 maps and presents a route from the first user (the follower) to the second user (the leader). In one embodiment, location services module 129 presents the route from the follower to the leader only to the follower. In another embodiment, location services module 129 also presents the route to the leader as an indication of the path the follower is taking, a distance between users within the caravan, etc.

At block 344, location services module 129 determines if location services module 129 has received the selection of a new caravan option from the second user device. In one embodiment, location services module 129 presents a selectable user interface object within the caravan navigation GUI to enable the leader or a follower to cancel the navigation or to make a new selection. For example, the users may change roles (from leader to follower and vice versa), change a destination, enter a destination after beginning the navigation/caravan, share a destination with the caravan, change from simply following a leader to navigating to an entered/shared destination, etc.

In one embodiment, location services module 129 presents a selectable user interface object within the caravan navigation GUI to enable the leader or a follower to communication with another user within the caravan. For example, location services module 129 may enable users to initiate phone or voice over internet protocol (VOIP) calls among the users within the caravan, record and send voice messages to other users within the caravan, compose text messages to other users within the caravan, send images or other media to other users within the caravan, etc.

If location services module 129 has received the selection of a new caravan option, method 300 returns to block 336. If location services module 129 has not received the selection of a new caravan option, at block 346, location services module 129 updates the route from the follower to the leader at a regular interval based upon shared location data from the first and second users. For example, the leader and/or the follower may be moving and, therefore, the route the follower is to take is regularly updated to reflect a new location of the leader and/or follower.

In one embodiment, caravan navigation terminates upon a user arriving at the destination. For example, location services module 129 terminates the regular updating of the route for the user that has shared a current physical location that coincides with the destination. In one embodiment, location services module 129 presents a social networking system post recommendation in response to detecting the user has arrived at the destination. For example, location services module 129 presents the user with an option to post a "check-in" at the destination location.

Requests for caravan navigation based upon shared location data is further described herein with reference to FIGS. 4-6 and 9-10.

Figure 3D:
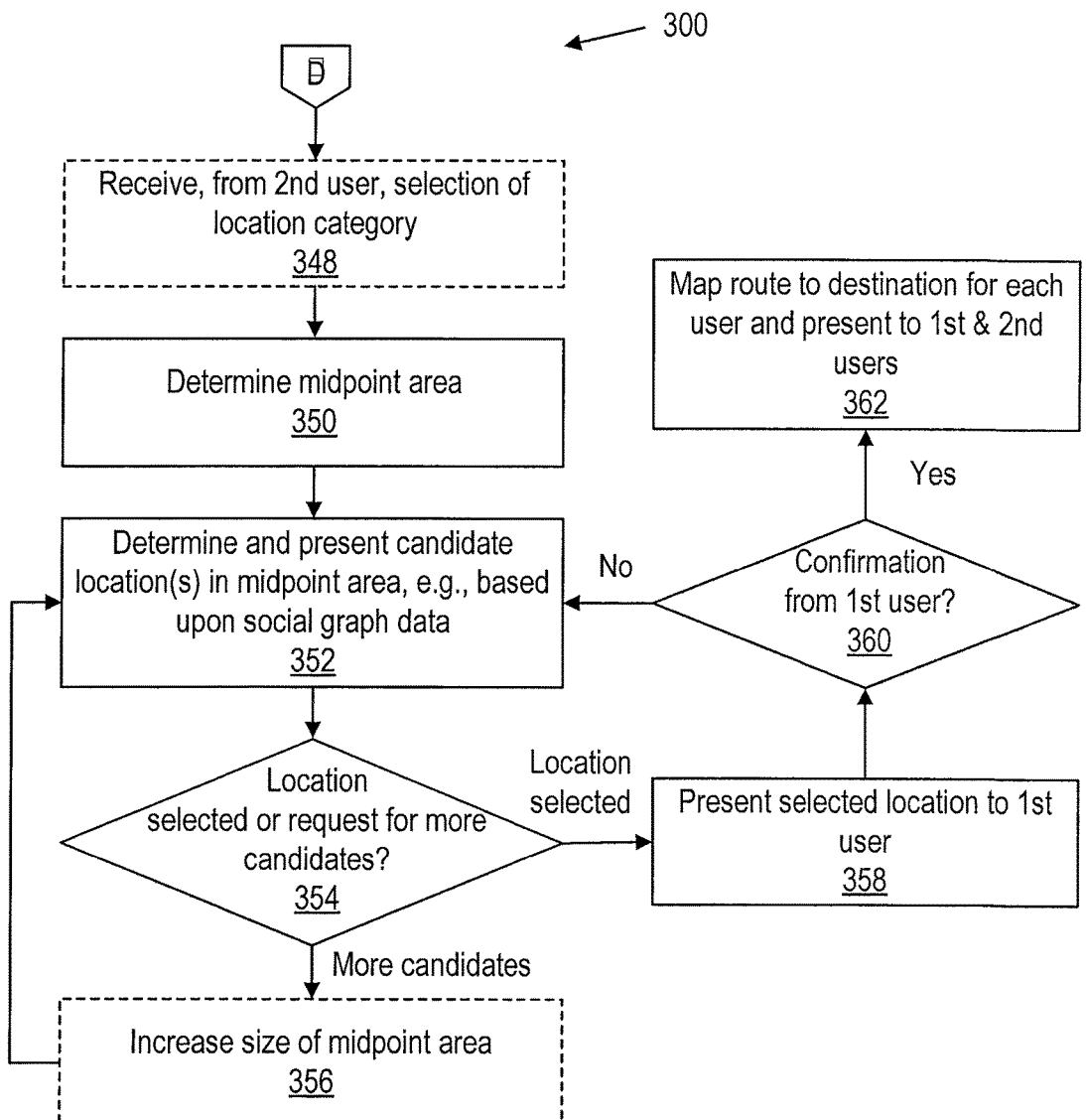

Referring to FIG. 3D, at block 348, location services module 129 optionally receives selection of a category for a location suggestion from the second user. Exemplary categories include restaurants, cafes, bars, parks, retail locations, arts and entertainment venues, etc.

At block 350, location services module 129 determines a midpoint area between the first and second users. For example, location services module 129 may determine a point that is equidistant between the first and second users. The midpoint area may include the geographical region within a radius or other distance value from the equidistant point.

At block 352, location services module 129 determines candidate meeting locations within the determined midpoint area. In one embodiment, location services module 129 determines candidate locations based upon social graph data. For example, location services module 129 selects one or more candidate locations that the first and/or second user has indicated as a favorite, likes, frequented, given a positive rating, etc. In one embodiment, location services module 129 selects one or more candidate locations that are similar to locations the first and/or second user has indicated as a favorite, likes, frequented, given a positive rating, etc. For example, if a user has indicated a first restaurant to be a favorite, location services module 129 selects a second restaurant that shares characteristics with the first restaurant, such as type of cuisine, price range, etc. In one embodiment, location services module 129 selects one or more candidate locations other users indicated as a favorite, liked, frequented, given a positive rating, etc. For example, location services module 129 may select a candidate location that is liked by one or more users that have similar social graph data (demographic information, actions taken, interests, etc.) to one or both of the users that are to meet. In one embodiment, location services module 129 recommends one or more locations based upon rankings as disclosed in U.S. patent application Ser. No. 13/800,633, which is incorporated herein in its entirety. Additionally, location services module 129 may select a candidate location that is generally popular amongst other users. Upon determining one or more candidate locations, location services module 129 presents the candidate location(s) to the second user, e.g., in a list or map.

At block 354, location services module 129 receives, from the second user device, user input and determines whether the user input includes a selection of a candidate location as a meeting location or a request for additional candidate locations. If the user input includes a request for additional candidate locations, at block 356, location services module 129 optionally increases the size of the midpoint area. For example, if there are no additional candidate locations within the midpoint area, location services module 129 incrementally increases the size of the midpoint area. In one embodiment, location services module 129 receives user input to move or resize the midpoint area. In response to a request for additional locations (or the resizing/moving of the midpoint area), method 300 returns to block 352 to determine and present the additional candidate locations within the current/increased midpoint area.

If the user input includes the second user's selection of a candidate location as a meeting location, location services module 129 presents the selected location to the first user. For example, location services module 129 transmits a message to the first user indicating that the second user has proposed meeting at the selected location.

At block 360, location services module 129 determines if the first user has confirmed the selected location. For example, the first user device may transmit a reply message to location services module 129 indicating whether or not the first user agrees to meet at the selected location. If the first user declines the selected location, location services module 129 presents an indication of the declined selection and method 300 returns to block 352 to enable the second user to select another candidate location. Alternatively, the reply message includes a location selected by the first user.

If the first user confirms the selected location, at block 362, location services module 129 generates a map and/or list of navigation instructions from the current location of each user to the selected location and presents each route to the corresponding user. In one embodiment, location services module 129 utilizes a third party API to generate and update the route as the corresponding user travels toward the selected location. In one embodiment, the navigation terminates upon a user arriving at the destination. For example, location services module 129 terminates the regular updating of the route for the user that has shared a current physical location that coincides with the selected location. In one embodiment, location services module 129 presents a social networking system post recommendation in response to detecting the user has arrived at the selected location. For example, location services module 129 presents the user with an option to post a "check-in" at the selected location.

Requests for a meeting location based upon shared location data is further described herein with reference to FIGS. 4-6 and 11.

Method 300 and embodiments set forth herein are described with reference to inputs received, e.g., via a GUI. In some embodiments, however, one or more inputs are received via voice input to the corresponding user device. For example, a mobile device 104 may receive and process speech to enter text, select menu options, or otherwise create inputs transmitted to location services module 129. Additionally, method 300 and embodiments set forth herein are described with reference to outputs presented/displayed, e.g., via a GUI. In some embodiments, however, one or more outputs are presented via audio. For example, navigation instructions may be provided via audio output in addition to or instead of visual instructions.

Figure 4:
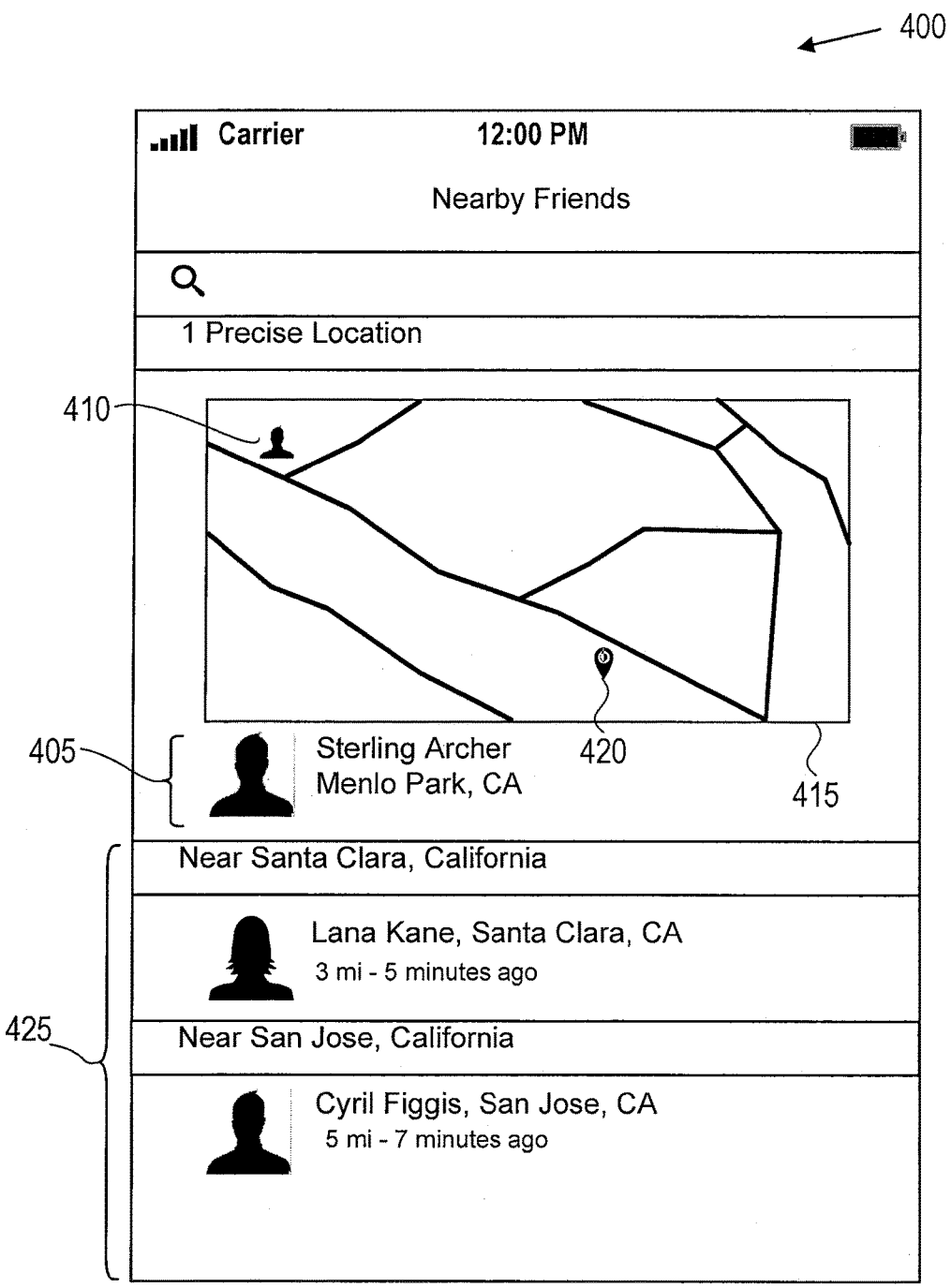
FIG. 4 illustrates an exemplary user interface including shared user location data.

FIG. 4 illustrates exemplary user interface 400 including shared user location data. For example, upon launching location sharing application 105 on mobile device 104, mobile device 104 transmits a request to location services module 129 for locations of connections that have permitted the sharing of location data with the user account associated with mobile device 104. In one embodiment, user permissions are used to differentiate between connections that share their precise location and connections that share a general, estimated location. For example, Sterling Archer 405 has shared his precise location, which may be used to find Sterling Archer's current physical location 410 as indicated on a map 415. In one embodiment, the map 415 further includes a current location 420 of the mobile device 104 displaying user interface 400 to provide the viewing user with an indication of the distance to Sterling Archer's current physical location 410. Two other users 420, Lana Kane and Cyril Figgis, have only shared an estimated location that gives an indication of a current city in which they are located.

Figure 5:
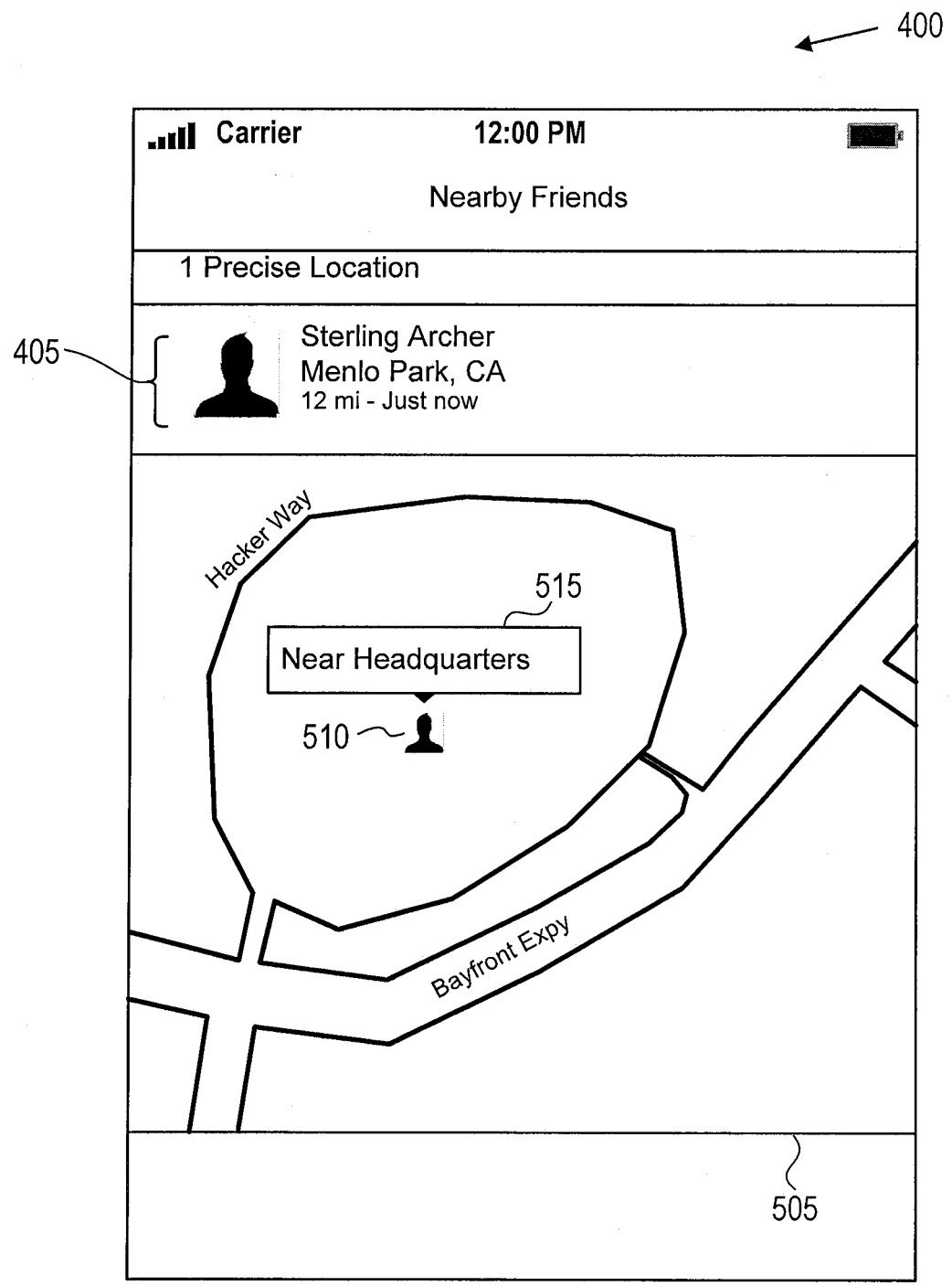
FIG. 5 illustrates an exemplary user interface including shared user location data of a selected user.

FIG. 5 illustrates user interface 400 including shared user location data of a selected user. For example, location services module 129 receives a user selection of Sterling Archer 405 (e.g., within user interface 400 as illustrated in FIG. 4) and, in response, transmits the current physical location of Sterling Archer 405 (or additional detail regarding the current physical location of Sterling Archer 405) to the mobile device 104 associated with the user's account. For example, location services module 129 transmits the location data such that the mobile device 104 presents map 505 at a closer zoom level to illustrate a more precise current physical location 510 of Sterling Archer 405. In one embodiment, the location data includes an address, name of a location, GPS coordinates, or another indication of the current physical location of the selected user. For example, map 505 includes label 515 indicating that Sterling Archer 405 is currently at a physical location 510 that is near or coincides with "Headquarters."

Figure 6:
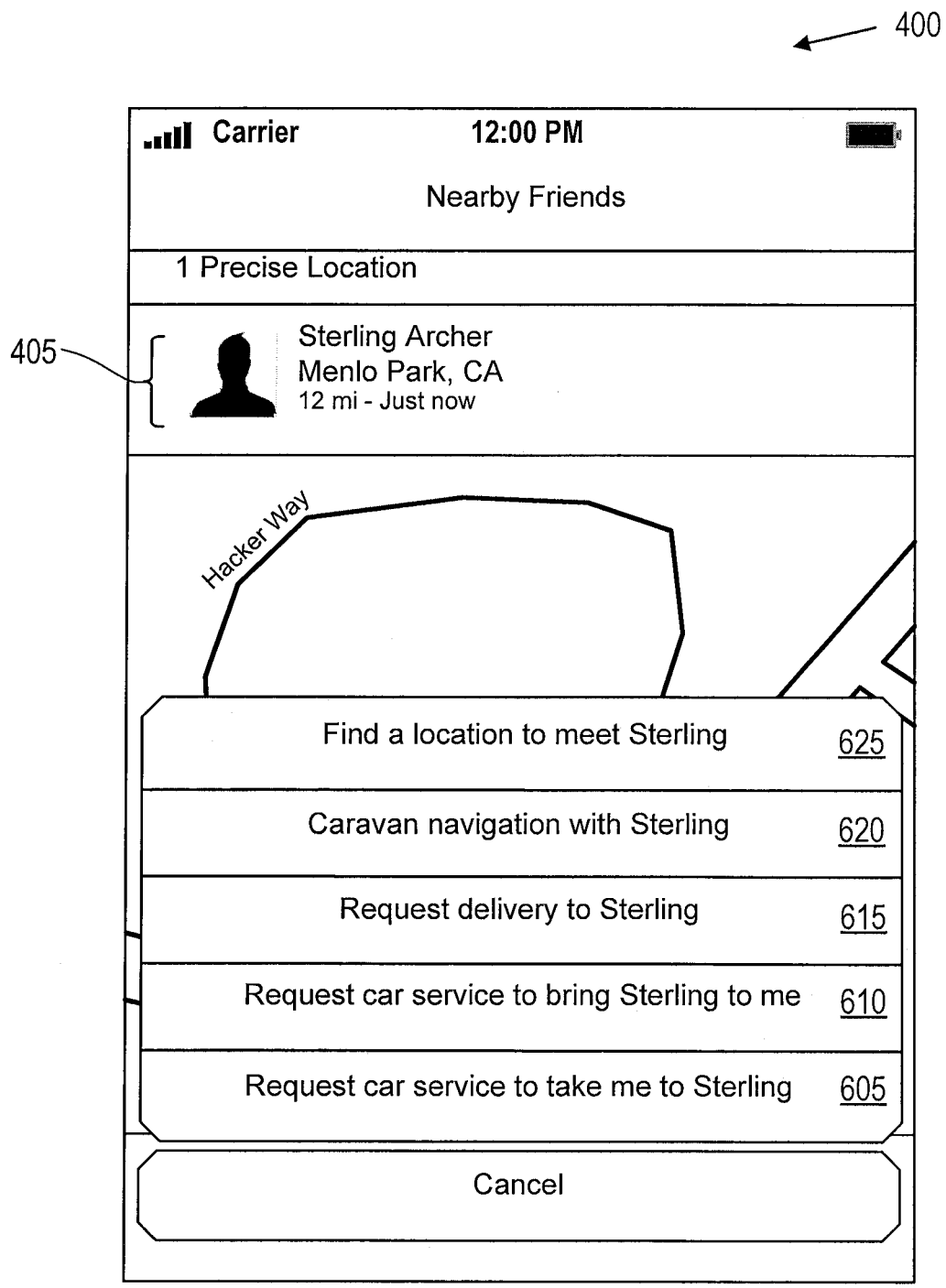
FIG. 6 illustrates an exemplary user interface including a menu of services that may be executed based upon the selected user's location data.

FIG. 6 illustrates user interface 400 including a menu of services that may be executed based upon the selected user's location data. For example, location services module 129 receives a user selection of current physical location 510 or label 515 (e.g., within user interface 400 as illustrated in FIG. 5) and, in response, instructs the user's mobile device 104 to present a menu of location-based services. As illustrated, the exemplary menu includes selectable options to request 605 a car service to take the user viewing user interface 400 to the current physical location 510 of the selected user (Sterling Archer), request 610 a car service to bring the selected user to the current physical location of the user viewing user interface 400, request 615 an item be delivered to the current physical location 510 of the selected user, request 620 to initiate caravan navigation with the selected user, and request 625 to find a location to meet the selected user. In response to receiving the selection of one of requests 605-625, location services module 129 utilizes the current physical location of one or both users sharing location data to initiate and/or execute the corresponding service. Requests 605-625 are discussed further herein with reference to FIGS. 3 and 7-11.

Figure 7:
FIG. 7 illustrates an exemplary user interface including an estimated fare for a car service between the shared locations of first and second users.

FIG. 7 illustrates user interface 400 including an estimated fare for a car service between the shared locations of first and second users. For example, location services module 129 receives a user selection of request 610 (e.g., within user interface 400 as illustrated in FIG. 6) to have a car service pick up the selected user at the current physical location of the selected user and bring the selected user to the current physical location of the user making the request. In response to request 610, location services module 129 transmits the current physical location of the selected user to a third party server associated with the car service as the pickup location. Additionally, location services module 129 transmits the current physical location of the requesting user to a third party server associated with the car service as the destination location. Location services module 129 receives, from the third party server, fare estimate 705 based upon the provided pickup and destination locations 710. User interface 400 further includes selectable element 715 enabling the user to enter a different destination and selectable element 720 enabling the user to confirm the current destination. In an alternate embodiment, in addition to location services module 129 transmitting the current physical location of the selected user to the third party server as the pickup location, location services module 129 launches a third party application that displays estimated fare 705, pickup and destination locations 710, and elements 715 and 720 to change/confirm the destination.

Figure 8:
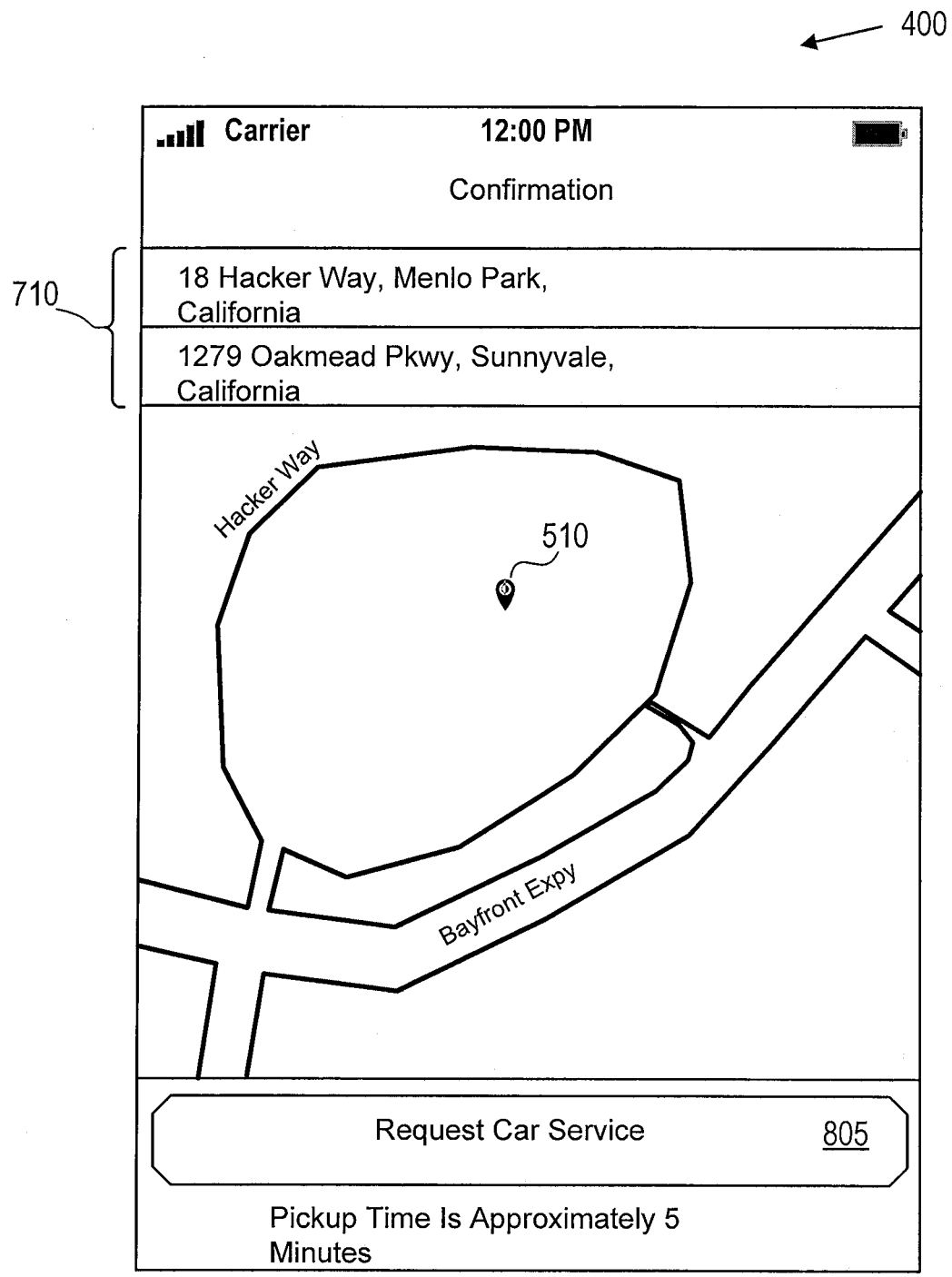
FIG. 8 illustrates an exemplary user interface for requesting a car service between the shared locations of first and second users.

FIG. 8 illustrates user interface 400 for finalizing the request for a car service between the shared locations of first and second users. For example, location services module 129 receives a user selection of request 610 (e.g., within user interface 400 as illustrated in FIG. 6) to have a car service pick up the selected user at the current physical location of the selected user and bring the selected user to the current physical location of the user making the request or a user selection of destination confirmation 720 (e.g., within user interface 400 as illustrated in FIG. 7). In response to the request, location services module 129 instructs the user's mobile device 104 to present pickup and destination locations 710, a map indicating pickup will occur at the current physical location of the selected user 510, and user interface element 805 to enable the requesting user to finalize the car service request.

FIGS. 7-8 are described with reference to a request for a car service to bring the selected user to the requesting user (e.g., in response to selection of request 610 as illustrated in FIG. 6). A similar set of user interfaces may be presented and a similar set of operations may be performed in response to a request for a car service to bring the requesting user to the selected user (e.g., in response to selection of request 605 as illustrated in FIG. 6) or to bring either user to another destination. Additionally, a similar set of user interfaces may be presented and a similar set of operations may be performed in response to a request for a delivery request (e.g., in response to selection of request 615 as illustrated in FIG. 6). A delivery request, however, may omit a pickup location.

Figure 9:
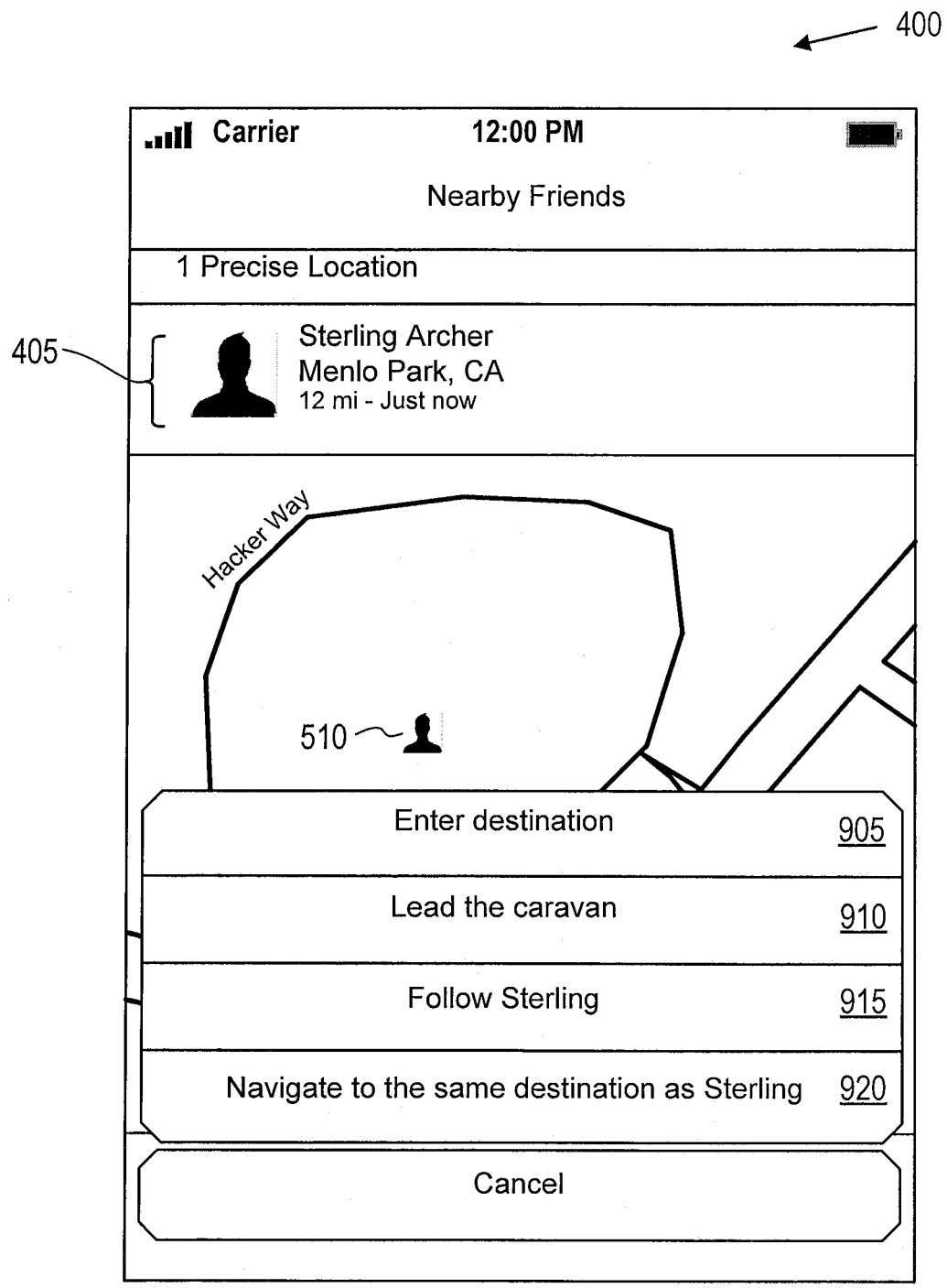
FIG. 9 illustrates an exemplary user interface including a menu of options for caravan navigation based upon location data shared between users.

FIG. 9 illustrates user interface 400 including a menu of options for caravan navigation based upon location data shared between users. For example, location services module 129 receives a user selection of request 620 (e.g., within user interface 400 as illustrated in FIG. 6) to provide caravan navigation. In response to request 620, location services module 129 instructs the user's mobile device 104 to present a menu of caravan navigation options. As illustrated, the exemplary menu includes option 905 to enter a destination for the caravan, option 910 to indicate that the viewing user will lead the caravan, option 915 to indicate the viewing user will follow the selected user, and option 920 for the viewing user to request navigation to a destination entered/shared by the selected user. In response to receiving the selection of one of options 905-920, location services module 129 utilizes the current physical location the users sharing location data to initiate and/or execute the corresponding caravan navigation service. The execution of requests based upon options 905-920 is discussed further herein with reference to FIGS. 3 and 10.

Figure 10:
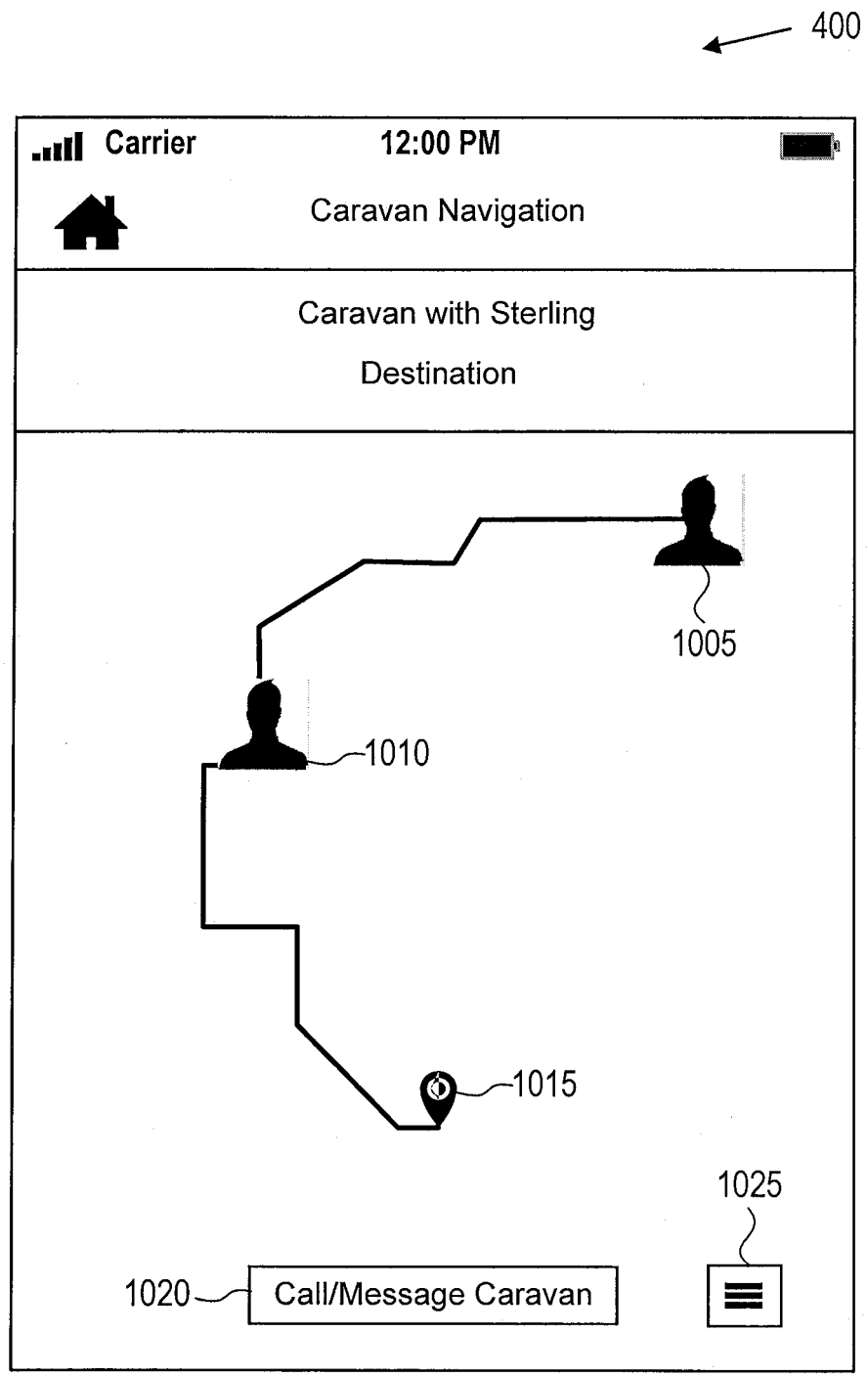
FIG. 10 illustrates an exemplary user interface including a mapped route within a caravan navigation service.

FIG. 10 illustrates user interface 400 including a mapped route within a caravan navigation service. For example, location services module 129 receives a user selection of one or more options 905-920 and, in response, instructs the user's mobile device 104 to present a map or other navigation instructions. As illustrated, the map includes follower 1005, leader 1010, and destination 1015. In one embodiment, a destination is not entered and, therefore, destination 1015 is omitted from the map and the caravan navigation focuses on navigating follower 1005 to leader 1010 based upon their respective regularly updated current physical locations. Additionally, follower 1005 may select option 920 to navigate to destination 1015 as shared by leader 1010 and, as a result, the navigation instructions may present a more direct route to destination 1015 than presented (e.g., by following a different route than the route taken by leader 1010).

As described herein, user interface 400 is illustrated as including a user interface element 1020 to facilitate communication between users in the caravan. For example, location services module 129 may utilize contact information stored in user profiles and/or communication tools within social networking system 130 to initiate a VOIP call or to transmit a message between users identified within the caravan.

User interface 400 also includes menu object 1025. For example, in response to user selection of menu object 1025, location services module 129 may instruct the user device to present menu options 905-920 to enable the user to change leader/follower roles, enter a destination, change a destination, share a destination, change routing from following to a shared destination, etc.

Figure 11:
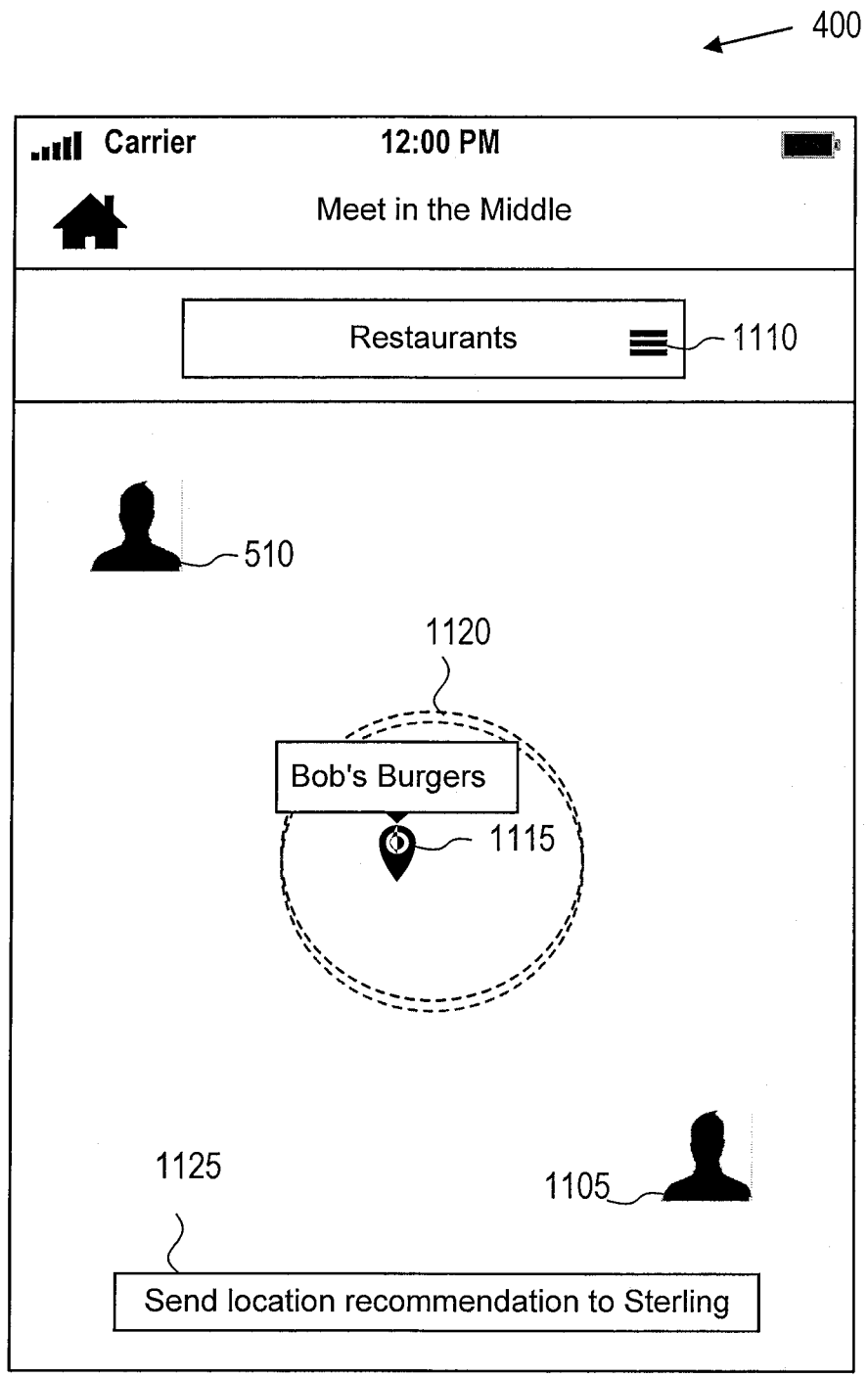
FIG. 11 illustrates an exemplary user interface for generating and sharing a recommended meeting location based upon location data shared between users.

FIG. 11 illustrates user interface 400 including a recommended meeting location based upon location data shared between users. For example, location services module 129 receives a user selection of request 625 (e.g., within user interface 400 as illustrated in FIG. 6) to provide one or more recommendations of locations for the users to meet. In response, location services module 129 determines a midpoint area 1120 based upon location data shared by the viewing user and the selected user, i.e., the current physical location of viewing user 1105 and selected user 1100 (e.g., Sterling Archer). As described herein, location services module 129 selects candidate location 1115 within midpoint area 1120 based upon social graph data and/or user reviews and, if applicable, a location category. Location services module 129 instructs the user device to present user interface 400 including a map or other indication of the current physical location of viewing user 1105, selected user 1100 (e.g., Sterling Archer), and candidate location 1115. In one embodiment, midpoint area 1120 is a selectable user interface object that may be moved and/or resized via gestures/touch input. In another embodiment, user interface 400 omits a representation of midpoint area 1120 from user interface 400. User interface 400 includes menu object 1110 to enable the user to select, e.g., from a drop-down menu, a category for candidate locations. For example, user interface 400 is illustrated with "restaurants" as the selected category. Accordingly, the candidate location 1115 recommended by location services module 129, Bob's Burgers, is a restaurant. User interface 400 further includes user interface object 1125 to enable the user to accept the candidate location and send the location as a recommendation to the selected user (e.g., Sterling Archer).

Figure 12:
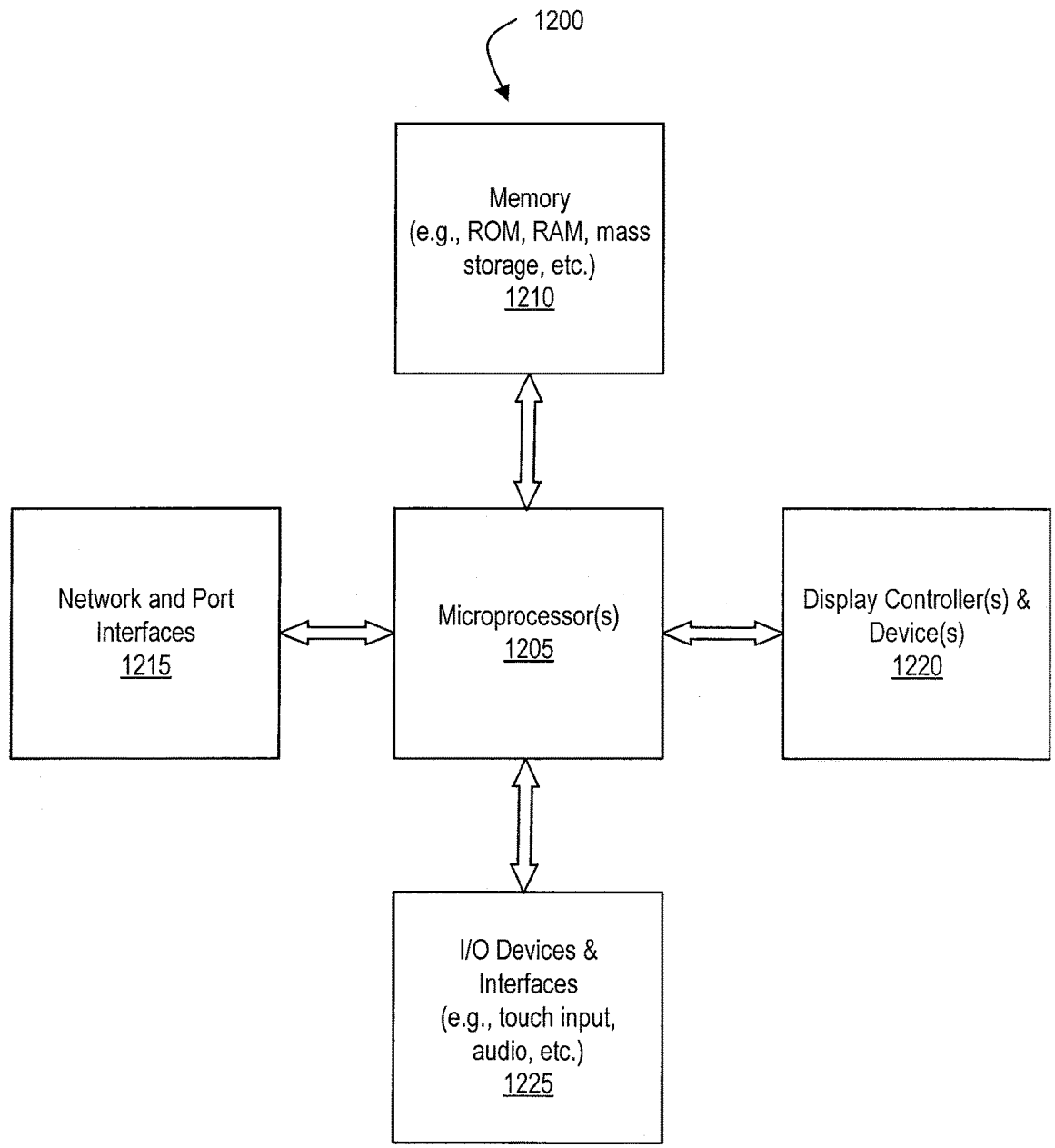
FIG. 12 illustrates, in block diagram form, an exemplary processing system to execute requests for services based upon real-time location data shared between users of a network service.

FIG. 12 illustrates, in block diagram form, an exemplary processing system 1200 to execute requests for services based upon real-time location data shared between users of a network service. Data processing system 1200 is an exemplary representation of one or more of the user devices 104, external server 115, social networking system 130, or components thereof described above.

Data processing system 1200 includes one or more microprocessors 1205 and connected system components (e.g., multiple connected chips). Alternatively, data processing system 1200 is a system on a chip.

Data processing system 1200 includes memory 1210, which is coupled to microprocessor(s) 1205. Memory 1210 may be used for storing data, metadata, and programs for execution by the microprocessor(s) 1205. For example, memory 1210 may include one or more of the data stores 101 and/or may store modules described herein. Memory 1210 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1210 may be internal or distributed memory.

Data processing system 1200 includes network and port interfaces 1215, such as a port, connector for a dock, or a connector for a USB interface, FireWire, Thunderbolt, Ethernet, Fibre Channel, etc. to connect the system 1200 with another device, external component, or a network. Exemplary network and port interfaces 1215 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 1200 with another device, external component, or a network and receive stored instructions, data, tokens, etc.

Data processing system 1200 also includes display controller and display device 1220 and one or more input or output ("I/O") devices and interfaces 1225. Display controller and display device 1220 provides a visual user interface for the user. I/O devices 1225 allow a user to provide input to, receive output from, and otherwise transfer data to and from the system. I/O devices 1225 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 12.

Data processing system 1200 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1200 may be a network computer, server, or an embedded processing device within another device or consumer electronic product. As used herein, the terms computer, device, system, processing system, processing device, and "apparatus comprising a processing device" may be used interchangeably with data processing system 1200 and include the above-listed exemplary embodiments.

Additional components, not shown, may also be part of data processing system 1200, and, in certain embodiments, fewer components than that shown in FIG. 12 may also be used in data processing system 1200. It will be apparent from this description that aspects of the inventions may be embodied, at least in part, in software. That is, the computer-implemented method 300 may be carried out in a computer system or other data processing system 1200 in response to its processor or processing system 1205 executing sequences of instructions contained in a memory, such as memory 1210 or other non-transitory machine-readable storage medium. The software may further be transmitted or received over a network (not shown) via network interface device 1215. In various embodiments, hardwired circuitry may be used in combination with the software instructions to implement the present embodiments. Thus, the techniques are not limited to any specific combination of hardware circuitry and software, or to any particular source for the instructions executed by data processing system 1200.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   receiving, from a first user device associated with a first user, location data representing a current physical location of the first user to be shared with a second user;
   receiving, from a second user device associated with the second user, a request for the current physical location of the first user;
   transmitting, to the second user device, a representation of the current physical location of the first user for display within a graphical user interface, the representation of the current physical location of the first user based upon the shared location data received from the first user device;
   receiving, from the second user device, a selection of a third party service, wherein the selection of the third party service includes selecting the third party service within the graphical user interface displayed on the second user device, the third party service presented on the graphical user device in response to selection of the representation of the current physical location of the first user within the graphical user interface; and
   transmitting, to a server associated with the third party service, the current physical location of the first user within a request for the third party service to send a product or service to the current physical location of the first user further comprising:
   receiving, from a third user device associated with a third user, location data representing a current physical location of the third user to be shared with a second user;
   receiving, from the second user device associated with the second user, a request for the current physical location of the third user;
   transmitting, to the second user device, the current physical location of the third user based upon the shared location data;
   receiving, from the second user device, a request to provide a meeting location suggestion between the current physical location of the second user to the current physical location of the third user;
   determining a midpoint area between the current physical location of the second user to the current physical location of the third user;
   transmitting, to the second user device, a meeting location suggestion based upon actions taken by one or both of the second and third users within a social networking system, the actions indicating a preference for the meeting location suggestion.

2. The computer-implemented method of claim 1, wherein the request for the third party service includes a request for the third party service to send a car service to pick up the first user.

3. The computer-implemented method of claim 2, further comprising:
   receiving, from the second user device, location data representing a current physical location of the second user, wherein the request for the third party service further includes the current physical location of the second user and a request for the car service to drive the first user to the current physical location of the second user.

4. The computer-implemented method of claim 3, further comprising:
   receiving, from the server associated with the third party service in response to the request, an estimated fare for driving the first user from the current physical location of the first user to the current physical location of the second user.

5. The computer-implemented method of claim 1, wherein the request for the third party service includes a request to deliver an item to the current physical location of the first user.

6. The computer-implemented method of claim 1, wherein transmitting the request for the third party service includes transmitting a name of the first user or a profile image of the first user to the third party service.

7. The computer-implemented method of claim 1, further comprising:
   receiving, from the server associated with the third party service, an identification of an employee of the third party service being sent to the current physical location of the first user in response to the request; and
   transmitting, to the first user device, the identification of the employee.

8. The computer-implemented method of claim 1, further comprising:
   receiving, from a third user device associated with a third user, location data representing a current physical location of the third user to be shared with a second user;
   receiving, from the second user device associated with the second user, a request for the current physical location of the third user;
   transmitting, to the second user device, the current physical location of the first user based upon the shared location data;
   receiving, from the second user device, a request to provide navigation instructions for the second user to follow the third user as the physical location of the third user changes;
   transmitting, to the second user device, navigation instructions from the current physical location of the second user to the current physical location of the third user; and
   transmitting, to the second user device, updated navigation instructions as the physical location of the third user changes.

9. The computer-implemented method of claim 8, further comprising:
   receiving a destination from the third user device;
   receiving, from the second user device, a request to navigate to the destination received from the third user device; and
   transmitting, to the second user device, updated navigation instructions to reflect a route from the current physical location of the second user to the destination.

10. A non-transitory computer-readable medium storing instructions which, when executed by one or more processors in a processing device, cause the processing device to perform a method comprising:
- receiving, from a first user device associated with a first user, location data representing a current physical location of the first user to be shared with a second user;
- receiving, from a second user device associated with the second user, a request for the current physical location of the first user;
- transmitting, to the second user device, a representation of the current physical location of the first user for display within a graphical user interface, the representation of the current physical location of the first user based upon the shared location data received from the first user device;
- receiving, from the second user device, a selection of a third party service, wherein the selection of the third party service includes selecting the third party service within the graphical user interface displayed on the second user device, the third party service presented on the graphical user device in response to selection of the representation of the current physical location of the first user within the graphical user interface; and
- transmitting, to a server associated with the third party service, the current physical location of the first user within a request for the third party service to send a product or service to the current physical location of the first user further comprising:
- receiving, from a third user device associated with a third user, location data representing a current physical location of the third user to be shared with a second user;
- receiving, from the second user device associated with the second user, a request for the current physical location of the third user;
- transmitting, to the second user device, the current physical location of the third user based upon the shared location data;
- receiving, from the second user device, a request to provide a meeting location suggestion between the current physical location of the second user to the current physical location of the third user;
- determining a midpoint area between the current physical location of the second user to the current physical location of the third user;
- transmitting, to the second user device, a meeting location suggestion based upon actions taken by one or both of the second and third users within a social networking system, the actions indicating a preference for the meeting location suggestion.

11. The non-transitory computer-readable medium of claim 10, wherein the request for the third party service includes a request for the third party service to send a car service to pick up the first user.

12. The non-transitory computer-readable medium of claim 11, the method further comprising:
- receiving, from the second user device, location data representing a current physical location of the second user, wherein the request for the third party service further includes the current physical location of the second user and a request for the car service to drive the first user to the current physical location of the second user.

13. The non-transitory computer-readable medium of claim 12, the method further comprising:
- receiving, from the server associated with the third party service in response to the request, an estimated fare for driving the first user from the current physical location of the first user to the current physical location of the second user.

14. The non-transitory computer-readable medium of claim 10, wherein the request for the third party service includes a request to deliver an item to the current physical location of the first user.

15. The non-transitory computer-readable medium of claim 10, wherein transmitting the request for the third party service includes transmitting a name of the first user or a profile image of the first user to the third party service.

16. The non-transitory computer-readable medium of claim 10, the method further comprising:
- receiving, from the server associated with the third party service, an identification of an employee of the third party service being sent to the current physical location of the first user in response to the request; and
- transmitting, to the first user device, the identification of the employee.

17. The non-transitory computer-readable medium of claim 10, the method further comprising:
- receiving, from a third user device associated with a third user, location data representing a current physical location of the third user to be shared with a second user;
- receiving, from the second user device associated with the second user, a request for the current physical location of the third user;
- transmitting, to the second user device, the current physical location of the third user based upon the shared location data;
- receiving, from the second user device, a request to provide navigation instructions for the second user to follow the third user as the physical location of the third user changes;
- transmitting, to the second user device, navigation instructions from the current physical location of the second user to the current physical location of the third user; and
- transmitting, to the second user device, updated navigation instructions as the physical location of the third user changes.

18. The non-transitory computer-readable medium of claim 17, the method further comprising:
- receiving a destination from the third user device;
- receiving, from the second user device, a request to navigate to the destination received from the third user device; and
- transmitting, to the second user device, updated navigation instructions to reflect a route from the current physical location of the second user to the destination.

* * * * *